United States Patent
Klippert et al.

[19]
[11] Patent Number: 6,003,403
[45] Date of Patent: Dec. 21, 1999

[54] DEVICE FOR THE AUTOMATIC STEPPED CABLE LENGTH ADJUSTMENT OF BOWDEN CABLE SYSTEM

[75] Inventors: Uwe Klippert, Oberaula; Christian Saunus, Grunbach; Georg Scheck, Weitramsdorf, all of Germany

[73] Assignees: Brose Fahrzeugteile GmbH & Co. KG; Coburg Ketschendorfer Strasse, both of Coburg, Germany

[21] Appl. No.: 09/005,118

[22] Filed: Jan. 9, 1998

[30] Foreign Application Priority Data

Jan. 11, 1997 [DE] Germany ............................ 197 00 746

[51] Int. Cl.⁶ ..................................................... F16C 1/10
[52] U.S. Cl. ..................... 74/502.4; 74/502.6; 74/500.5; 74/501.5 R; 74/527; 74/526; 403/379.1; 403/379.5
[58] Field of Search ............................ 74/500.5, 501.5 R, 74/502.4, 502.6, 526, 527; 403/379.5, 379.1, 378

[56] References Cited

U.S. PATENT DOCUMENTS

| | | | |
|---|---|---|---|
| 3,714,843 | 2/1973 | Bracey | 74/527 |
| 4,331,041 | 5/1982 | Bennett | 74/502.4 |
| 4,694,706 | 9/1987 | Lichtenberg et al. | 74/502.4 |
| 5,531,134 | 7/1996 | Petruccello | 74/502.4 |
| 5,598,743 | 2/1997 | Yasuda | 74/502.6 |
| 5,664,462 | 9/1997 | Reasoner | 74/502.4 |
| 5,911,791 | 6/1999 | Srinivas | 74/501.5 R |

FOREIGN PATENT DOCUMENTS

| | | |
|---|---|---|
| 0658696 | 6/1995 | European Pat. Off. . |
| 3805046 | 9/1989 | Germany . |
| 3818323 | 9/1989 | Germany . |
| 9017236 | 6/1991 | Germany . |
| 833739 | 4/1960 | United Kingdom ..................... 74/527 |
| WO 90/13752 | 11/1990 | WIPO .................................... 403/378 |
| WO9322571 | 11/1993 | WIPO . |
| WO9625604 | 8/1996 | WIPO . |

*Primary Examiner*—Tamara L. Graysay
*Assistant Examiner*—Chong H. Kim
*Attorney, Agent, or Firm*—Christie, Parker & Hale, LLP

[57] ABSTRACT

A device for the automatic, stepped cable length compensation of a Bowden cable system in which a spring-tensioned cable is guided. The spring is supported between a part on the housing side and a part on the Bowden tube side displaceable relative thereto and having several detent elements resiliently pretensioned in the direction of the sleeve face of the part on the Bowden tube side. During displacement of the part on the Bowden tube side the detent elements engage in succession in front of the end face of this part so that a resetting movement of the part on the Bowden tube side is prevented. Each detent element is allocated a pair of stops between which the detent, element is mounted for restricted axial displacement. In another embodiment, at least a pair of spaced stops correspond with an intermediate part mounted between the part on the housing side and the part on the Bowden tube side which is displaceable a restricted amount so that a cable length compensating detent process can only take place after overcoming a predetermined setting movement between the part on the housing side and the part on the Bowden tube side. The parts which can be displaced a restricted amount are detent elements which have an axial spacing relative to each other. The pair of spaced stops is a constituent part of the part on the Bowden tube side between which engages a keyed locking element of the intermediate part.

7 Claims, 2 Drawing Sheets

DEVICE FOR THE AUTOMATIC STEPPED CABLE LENGTH ADJUSTMENT OF BOWDEN CABLE SYSTEM

BACKGROUND

The invention relates to a device for the automatic stepped cable length adjustment of a Bowden cable system characterised by a simple construction, reliable functioning and the possibility of being made optionally from plastics or metal.

Cable length adjustment devices are generally used where cables are used as force-transferring members and the cable lengthening which occurs due to such force transference must be compensated in order to maintain proper functioning of the system.

Devices of this kind are particularly widespread for so-called Bowden window regulators for lifting and lowering the side window panes of motor vehicles. Common to many cable length compensating devices is the use of two parts displaceable relative to each other which are held under tension by a spring and then carry out an adjusting movement when cable slack occurs. This adjusting movement corresponds in effect to a lengthening of the Bowden tube.

Furthermore it is known from DE 38 05 046 C2 to lock by means of detent elements the relative position of the two relatively displaceable parts. This position is reached following the adjusting movement. A number of narrow detent elements lying one above the other and which can fall one after the other behind the free end of the displaceable part ensures a finely stepped cable length compensation. This device is however not in a position to differentiate between a so-called genuine cable slack and an apparent cable slack which occurs in the event of high strain on a cable loop of a cable window regulator in the unloaded area of the cable loop, for example, when the window pane reaches its full end stop position at the end of a lifting or lowering operation. Thus considerable tensions can appear in the system which through increased friction lead to deterioration in the degree of efficiency of the adjustment device and to accelerated wear.

From EP 0 658 696 A1 a cable length adjustment device is known having a tubular part on the housing side and a part on the Bowden tube side mounted displaceably therein. The Bowden tube is supported on one side on the part on the Bowden tube side and a compression spring is supported on the other which directs a force on the part on the Bowden tube side in the direction of the Bowden tube. Several slits are formed circumferentiaiiy and spread out in the wall of the tubular part on the housing side through which detent teeth of an elastic open ring can engage and enter into engagement with the counter teeth of the part on the Bowden tube side.

The expansion of the slits in the displacement direction is greater than the height of the detent teeth so that during a displacement movement of the part on the Bowden tube side, first the detent teeth of the elastic ring are dragged along by the detent teeth until it reaches the boundary face of the slits acting as stops. Only a displacement movement beyond this results in relative movement between the elastic ring and the part on the Bowden tube side and in a permanent, i.e., locked setting movement (cable length compensating movement). In other words, the displacement movement must be at least the sum of the axial play of the elastic ring in the slits of the part on the housing side and of the division of the permanent saw-tooth like teeth of the part on the Bowden tube side to result in a permanent cable length compensating movement. In each case, the predetermined axial play is available for relaxing the tension in the system in that the supporting forces of the Bowden tube cause a restricted, non-permanent, resetting movement of the displaceable part on the Bowden tube side until the detent teeth of the elastic ring have reached the other stop of the slits.

However the device described has the drawback that the spring elastic ring supporting the detent teeth can only be made of plastic owing to the large expansion required for assembly. Thus the forces which can be transferred by same are duly restricted.

A device which is identical in operation and very similar in construction is described in WO 96/25604. It also consists of a part on the housing side and a sleeve-like part on the Bowden side displaceable therein and having external teeth in which the teeth of a locking element can engage. The locking element of this device is also mounted displaceably between two stops so that the system is provided with an axial longitudinal play which prevents excess tension of the adjustment device.

It is however disadvantageous that the inner arrangement of the detent element leads to the formation of comparatively small detent teeth. In conjunction with the locking element which has to be made from plastic owing to the demand for elastic deformability, this device can also only be loaded to a restricted amount.

SUMMARY

Provided in accordance with an embodiment of the invention is a device for the automatic stepped cable length adjustment with play allowance which has a simple construction, good adaptability even to high strains and a simple fitting.

According to one embodiment, a device is provided for the automatic stepped cable length compensation of a Bowden cable system having a housing side and a Bowden tube side. The device includes a part on the housing side; a part on the Bowden tube side displaceable relative to the part on the housing side and having a sleeve face and an end face; a spring supported between the part on the housing side and the part on the Bowden tube side; a cable tensioned by the spring and guided through the part on the housing side and the part on the Bowden tube side; detent elements that are axially spaced apart and resiliently pretensioned in a direction of the sleeve face of the part on the Bowden tube side; and a pair of stops associated with each of the detent elements between which the associated detent element is mounted for restricted axial displacement. During displacement of the part on the Bowden tube side, the detent elements can engage in succession in front of the end face of the part on the Bowden tube side so that a resetting movement of the part on the Bowden tube side is prevented. Also, each of the detent elements is displaceable a restricted amount so that a cable length compensating detent process can only take place after overcoming a predetermined setting movement between the part on the housing side and the part on the Bowden tube side; and a pair of stops associated with each of the detent elements between which the associated detent element is mounted for restricted axial displacement.

In an alternate embodiment, in lieu of axially displaceable detent elements, an intermediate part having a keyed locking element is provided and mounted between the part on the housing side and the part on the Bowden tube side and with which the resiliently pretensioned detent elements engage, as well as a pair of spaced stops forming a constituent part of the part on the Bowden tube side between which engages the keyed locking element of the intermediate part so that a cable length compensating detent process can only take place after overcoming a predetermined setting movement between the part on the housing side and the part on the Bowden tube side.

Thus according to another embodiment of the invention, several spaced detent elements are used which are axially displaceable in separate guide slits, and which can snap one after the other behind the free end of the part on the Bowden tube side if this part, having the appearance of a cable slack, is displaced sufficiently far in the axial direction relative to the part on the housing side. The boundary faces of the guide slits lying in the axial direction serve as stop faces for the detent elements. Their play inside the guide slits represents the minimal re-setting path that does not result in a permanent, or locked, resetting movement. Hence, this non-permanent resetting path is always available for relaxation of the system after a tensioning. The axial extension of the guide slits preferably corresponds to a multiple of the thickness of the detent elements so that a resetting path of about 3 mm to 10 mm per metre steel cable is provided.

According to another embodiment of the invention, an intermediate part is mounted between the part on the housing side and the part on the Bowden tube side, wherein the free end of this intermediate part can enter into engagement with the resiliently pretensioned detent elements which are mounted substantially play-free in the guide slits. A pair of axially spaced stops is provided which is a constituent part of the displaceable part on the Bowden tube side. A positive locking element of the intermediate element engages between the stops so that this can be displaced with restricted axial movement relative to the part on the Bowden tube side. This play corresponds to the non-permanent, or non-lockable, resetting path described above which prevents excessive tensioning of the Bowden cable system. With this embodiment of the invention, the supporting force of the Bowden tube is directed from the displaceable part on the Bowden tube side through the intermediate part and one of the detent elements into the part on the housing side. The supporting face between the part on the Bowden tube side and the intermediate part represents one of the two stop faces which restricts the movement play of the part on the Bowden tube side. It is possible to make the play greater than the division of the detent elements so that, on the one hand a very fine stepped cable length compensation is guaranteed, and on the other side a large resetting path can be provided to avoid excessive system tensions.

Since various embodiments of the invention are designed without teeth elements on the outer contour of the guide sleeve the part on the Bowden tube side can be made with very simple construction both from plastic and a metal material. The clear locking conditions between the resiliently pretensioned detent elements and the associated free end of the part on the Bowden tube side or intermediate part provide the device with a high functional reliability and load bearing capacity.

BRIEF DESCRIPTION OF THE DRAWINGS

The invention will now be explained in more detail with reference to the embodiments shown in the drawings in which.

DETAILED DESCRIPTION

Figures 1A, 1B:
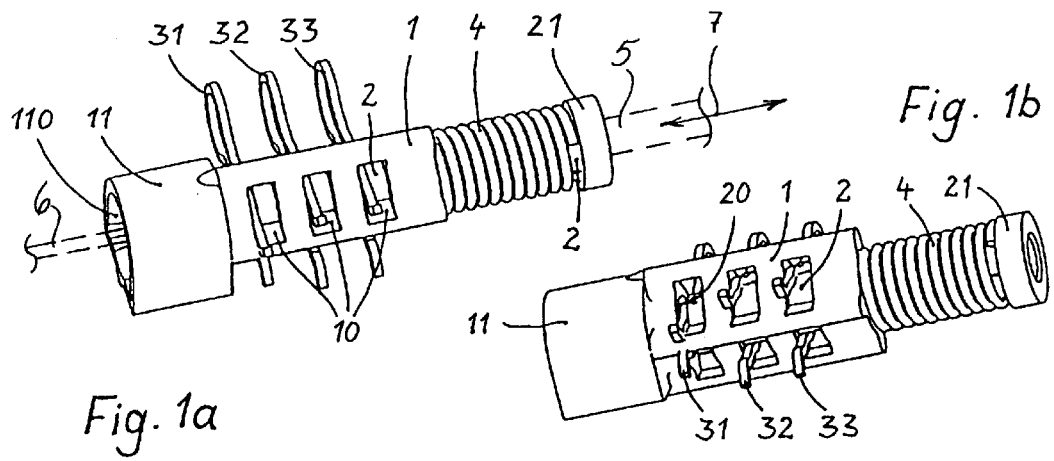
FIGS. 1a, 1b are perspective illustrations of a cable length compensating device with axially displaceable detent elements according to one embodiment of the invention with a fully compressed compression spring.

FIGS. 1a to 3b show an embodiment of the invention with axially displaceable detent elements 31, 32, 33 in three displacement positions of a part 2 on the Bowden tube side in each of two different perspective views. According to this embodiment, the cable length compensating device consists of a part 1 on the housing side with an adaptor 11 by means of which the device can be fitted for example onto a drive housing (not shown) or a cable pulley of a Bowden tube window regulator (not shown). FIG.1a illustrates schematically a cable (in phantom) extending through the cable length compensating device. The cable 6 is contained in a Bowden tube 5 beyond the end of the part 2 on the Bowden tube side. Obviously it is also possible to form the part 1 on the housing side in one piece on a housing which is to be manufactured by injection molding or casting.

The area of the part 1 or the housing side adjoining the adaptor 11 has a tubular shape and three evenly spaced guide slits 10 in which clip-like detent elements 31, 32, 33 are mounted. Preferably the detent elements are U-shaped metal clips and have on at least one arm a bulge which partially encloses the sleeve face of the part on the Bowden tube side to prevent loss of the clip. In operation, the detent elements lie first with pretension on the sleeve face of the part 2 on the Bowden tube side before they snap—during corresponding displacement movement—one after the other in front of a free end 20 of the part 2 on the Bowden tube side, thereby supporting that part 2 in a new position. The part 2 on the Bowden tube side is displaceably guided inside the part 1 on the housing side. The compression spring 4 engages on a ring-shaped ledge 21 of the part 2 on the Bowden tube side and directs a force on the part 2 on the Bowden tube side against the supporting force of the Bowden tube in the displacement direction 7.

According to FIGS. 1a–3b, the width of the guide slits 10 measures roughly three to four times a thickness 300 of the detent elements 31, 32, 33. Thus the clearance of the detent elements 31, 32, 33 and the amount of resetting movement provided for relaxing the system is two to three times the thickness of the detent elements 31, 32, 33. The boundary faces of the guide slits in the axial direction represent stop faces for the detent elements 31, 32, 33 which, with each displacement movement of the part 2 on the Bowden tube side, are dragged along until the detent elements 31, 32, 33 clamp on a sleeve face of the part 2 on the Bowden tube side.

Figures 2A, 2B:
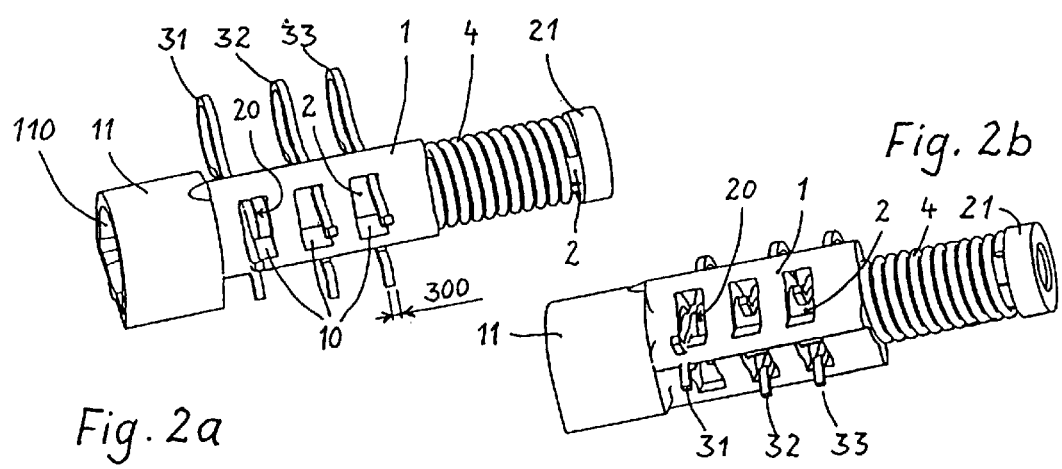
FIGS. 2a, 2b are perspective illustrations of the cable length compensating device of FIGS. 1a and 1b after an initial displacement movement which corresponds roughly to the movement of the detent elements in the guide slits.
Figures 3A, 3B:
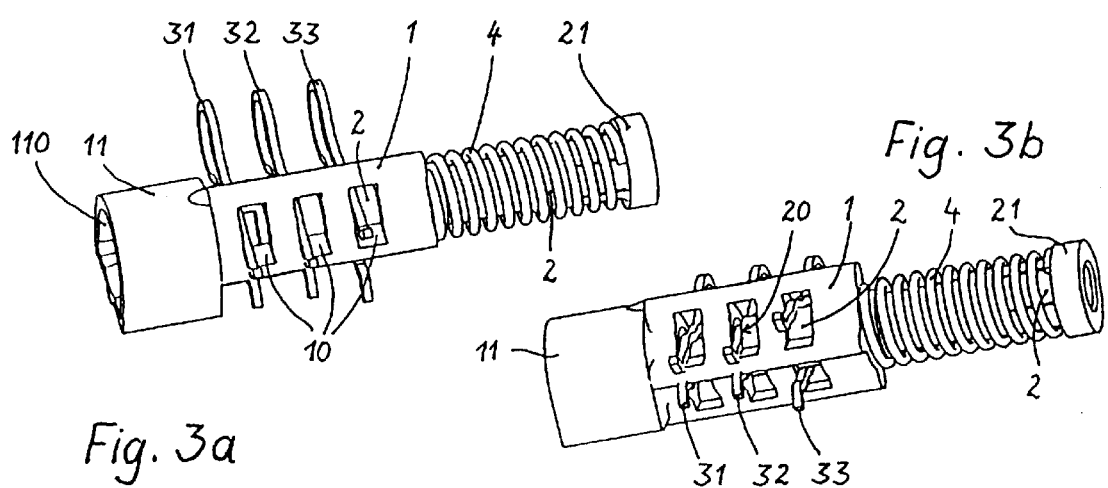
FIGS. 3a, 3b are perspective illustrations of the cable length compensating movement of the device of FIGS. 1a and 1b after engagement of a middle detent element and implementation of a relaxing resetting movement.

According to FIGS.1a and 1b the free end 20 of the part 2 on the Bowden tube side is initially supported on the first detent element 31 whilst the other detent elements 32, 33 rest with elastic pretension on the part 2 on the Bowden tube side. FIGS. 2a and 2b show an initial displacement movement of the part 2 on the Bowden tube side wherein the detent elements 32, 33 are drawn along up to the opposing stop faces of the relevant guide slits 10. Only when the part 2 on the Bowden tube side is pushed so far that the free end 20 reaches in the displacement direction 7 at least the stop of the guide slit 10 belonging to the detent element 32, can a further discreet amount of a cable length compensating movement be locked by the detent element 32 snapping in front of the free end 20 of the part 2 on the Bowden tube side. As soon as a supporting force is again applied by the Bowden tube, there follows the resetting movement already described wherein the detent element 32 is returned against the other stop face of the guide slit 10 (compare with FIGS. 3a and 3b). This leads to a reduction in the tensile stress in the cable.

Figure 4:
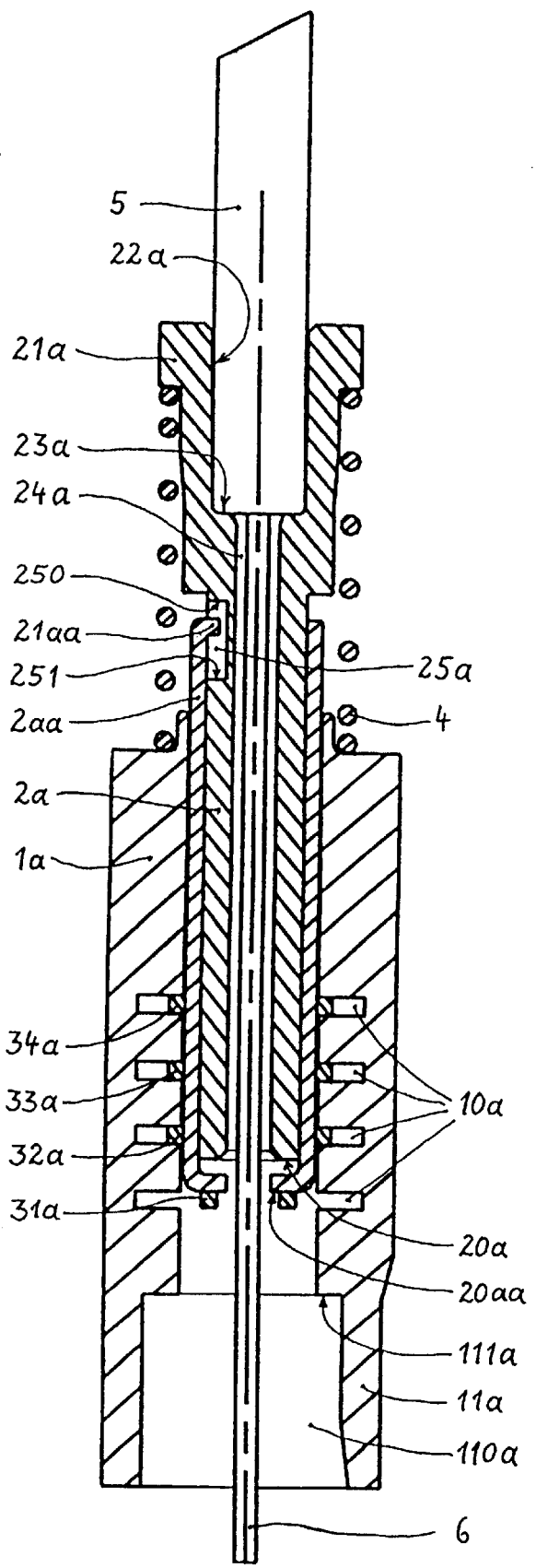
FIG. 4 is a sectional view of a cable length compensating movement according to another embodiment with an intermediate part between the part on the housing side and the part on the Bowden tube side.

A further embodiment of the invention is shown in the sectional view in FIG. 4. Guide slits 10a are formed in the tubular part 2a on the housing side for holding the detent elements 31a, 32a, 33a, 34a substantially free of play. The part 2a on the Bowden side is displaceably guided inside the part 1a with the upper end having an expansion of the cable channel with stop face 23a for holding the Bowden tube 5. A ring-shaped ledge 21a serves to support the compression spring 4. An intermediate sleeve 2aa is connected to the shaft of the part 2a on the Bowden side with restricted displacement and in keyed engagement through the recess 25a and keyed locking element 21aa.

The method of operation of the device is as follows: As soon as the Bowden tube 5 is sufficiently relaxed through a cable slack, the compression spring 4 can press the part 2a on the Bowden side out by a certain amount from the guide of the part 1a on the housing side. The intermediate sleeve 2aa is thereby first held secured by the detent elements 32a, 33a, 34a until the positive locking element 21aa engages with the stop face 251. Only with further displacement is the intermediate sleeve 2aa dragged along and can pass the next detent element 32a where applicable with its free end 20aa. In each case the result is a resetting movement of the part 2a on the Bowden side with the Bowden tube 5 inserted therein when the reaction force of the Bowden 5 is restored. The Bowden side part 2a then drops so far down in the intermediate sleeve 2aa until the free ends 20a and 20aa meet one another or until the keyed locking element 21aa and stop 251 engage with each other. The amount of system relaxation possible is determined by the play between the parts 2a and 2aa.

We claim:

1. A device for the automatic stepped cable length compensation of a Bowden cable system having a housing side and a Bowden tube side and comprising:

a part on the housing side;

a part on the Bowden tube side displaceable relative to the part on the housing side and having a sleeve face and an end face;

a spring supported between the part on the housing side and the part on the Bowden tube side for tensioning a cable by the action of the spring;

a plurality of detent elements being spaced apart axially and resiliently pretensioned in a direction of the sleeve face of the part on the Bowden tube side, wherein the detent elements during a displacement of the part on the Bowden tube side are engaged in succession in front of the end face of the part on the Bowden tube side so that a resetting movement of the part on the Bowden tube side is prevented, wherein each of said plurality of detent elements is displaceable a restricted amount so that a cable length compensating detent process takes place only after overcoming a predetermined setting movement between the part on the housing side and the part on the Bowden tube side; and a pair of stops associated with each of the plurality of detent elements between which the associated detent element is mounted for restricted axial displacement.

2. The device according to claim 1, wherein the part on the housing side comprises a plurality of guide slits, each having a pair of axial boundary faces, wherein the detent elements are mounted in the guide slits of the part on the housing side wherein the axial length of the guide slits corresponds to a multiple of a thickness of the detent elements, and wherein each said pair of stops form the axial boundary faces of the guide slits.

3. The device according to claim 1, wherein the detent elements comprise a plurality of individual metal clips which are substantially U-shaped and each have two arms, wherein at least one of said arms of said clips has an outwardly aligned bulge which partially encloses the sleeve face of the displaceable part on the Bowden tube side to prevent loss of said clip.

4. The device according to claim 1, wherein an axial play of each of the plurality of detent elements between the associated pair of spaced stops corresponds at least to double the thickness of the detent elements.

5. The device according to claim 1, wherein an axial play of each of the plurality of detent elements between the associated pair of spaced stops is between 3 mm and 10 mm.

6. The device according to claim 1, wherein the Bowden cable system is a Bowden tube window regulator.

7. The device according to claims 1, wherein the detent elements comprise a plurality of interconnected metal clips which are substantially U-shaped and each having two arms, wherein at least one arm has an outwardly aligned bulge which partially encloses the sleeve face of the displaceable part on the Bowden tube side to prevent loss of the clip.

* * * * *